(12) United States Patent
Mennebeuf et al.

(10) Patent No.: US 12,130,188 B2
(45) Date of Patent: Oct. 29, 2024

(54) STRUCTURE HAVING A WALL EQUIPPED WITH AN OPTICAL SENSOR MEASURING DEVICE SURROUNDED BY A FLEXIBLE ENVELOPE CLOSELY ATTACHED TO THE WALL, AND METHOD FOR INSTALLING THE DEVICE

(71) Applicant: Airbus Operations SAS, Toulouse (FR)

(72) Inventors: Laetitia Mennebeuf, Toulouse (FR); Nicolas Dupe, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 894 days.

(21) Appl. No.: 17/122,396

(22) Filed: Dec. 15, 2020

(65) Prior Publication Data
US 2021/0181038 A1 Jun. 17, 2021

(30) Foreign Application Priority Data
Dec. 17, 2019 (FR) ..................... 1914556

(51) Int. Cl.
| G01K 11/32 | (2021.01) |
| B64D 45/00 | (2006.01) |
| B64F 5/60 | (2017.01) |
| G02B 6/46 | (2006.01) |

(52) U.S. Cl.
CPC .............. *G01K 11/32* (2013.01); *B64F 5/60* (2017.01); *G02B 6/46* (2013.01); *B64D 45/00* (2013.01); *B64D 2045/0085* (2013.01)

(58) Field of Classification Search
CPC .................................................. G01K 11/32
See application file for complete search history.

(56) References Cited

U.S. PATENT DOCUMENTS

| 6,215,927 B1 | 4/2001 | Singh | |
| 7,043,977 B2 | 5/2006 | Magnin | |
| 8,325,338 B1 * | 12/2012 | Pope | G01N 21/65 356/301 |
| 2005/0066722 A1 * | 3/2005 | Magnin | G01M 9/06 73/170.02 |

FOREIGN PATENT DOCUMENTS

| CN | 106404065 A * | 2/2017 | B29C 70/34 |
| DE | 102007048817 A1 | 4/2009 | |
| EP | 3306324 A1 * | 4/2018 | B64C 1/36 |
| FR | 2860293 | 9/2003 | |
| WO | 9961875 A1 | 12/1999 | |

OTHER PUBLICATIONS

Translation of CN106404065A (Year: 2017).*
French Search Report; priority document.

* cited by examiner

*Primary Examiner* — Mirellys Jagan
(74) *Attorney, Agent, or Firm* — Greer, Burns & Crain, Ltd.

(57) ABSTRACT

A measuring device able to be closely attached to an outer wall of a movable or fixed object located in an air flow. The measuring device comprises a flexible envelope having a cavity provided with an opening orifice. At least one optical fiber is provided in the cavity, the opening orifice of which is closed by the wall on which the envelope is applied. In this way, the fiber is positioned as closely as possible to the wall for which measurements are desired.

11 Claims, 4 Drawing Sheets

STRUCTURE HAVING A WALL EQUIPPED WITH AN OPTICAL SENSOR MEASURING DEVICE SURROUNDED BY A FLEXIBLE ENVELOPE CLOSELY ATTACHED TO THE WALL, AND METHOD FOR INSTALLING THE DEVICE

CROSS-REFERENCES TO RELATED APPLICATIONS

This application claims the benefit of the French patent application No. 1914556 filed on Dec. 17, 2019, the entire disclosures of which are incorporated herein by way of reference.

FIELD OF THE INVENTION

The present invention concerns a measuring device able to be closely attached to an outer wall of a movable or fixed object located in an air flow, in particular for measuring the temperature of the surface of the wall, and a method for installing the device on the wall.

BACKGROUND OF THE INVENTION

During flight tests, sensors are mounted on the outer surface of an aircraft in order to perform various types of measurement. One such measurement comprises measuring the temperature of the outer surface of the fuselage, namely the outer temperature of the skin of the aircraft, and in particular measuring at the level of the engine air intake.

Patent FR2860293 filed by Airbus France on 26 Sep. 2003 describes a device for measuring parameters during flight testing of an aircraft. The device comprises a sensor mounted in a rigid insert surrounded by a flexible envelope which is bonded to the outer surface of an aircraft structure. The flexible envelope adapts to the surface of the aircraft and has a greater thickness than the insert; the insert, and hence the sensor, therefore does not touch the structure of the aircraft. The vibrations of the aircraft are damped by the envelope and not transmitted to the sensor.

Because of this distance between the sensor and the skin, such a device does not make it possible to correctly assess the temperature of the skin. It was designed for measurements of pressure, noise or other parameters in the air flow, on the opposite side of the device from that of the skin.

SUMMARY OF THE INVENTION

An object of the present invention is to propose a measuring device and a method for installing the device which make it possible to rectify this drawback, and to improve the quality of the measurements performed.

To this end, the present invention concerns a structure having a wall equipped with a measuring device comprising:
  a flexible envelope having a cavity provided with an opening orifice and comprising two faces forming the longitudinal edges of the envelope,
  at least one optical fiber is provided in the cavity, the opening orifice of which is closed by the wall on which the envelope is applied,
  and wherein the longitudinal edges of the envelope have a decreasing thickness tapering towards the periphery.
In this way, the fiber is positioned as closely as possible to the wall for which measurements are desired.

In addition, the edges of the envelope having a decreasing thickness tapering towards the periphery make it possible to provide a surface offering very little disruption to the aerodynamic flow.

The invention provides at least one of the following optional characteristics, taken in isolation or in combination.

The cavity is produced by deformation of the envelope when the cavity is applied on the fiber.

The cavity is preformed in the envelope.

The fiber is covered with a sheath in the form of a sleeve, and the fiber is therefore a sheathed fiber.

At least one layer of fixing material, resistant to the conditions to which the wall is exposed, is provided at least partly between the surfaces of the envelope and the wall that are in contact.

The layer of fixing material is provided on the wall of the structure over the entire surface area intended to be in contact with the envelope, but also the surface opposite the opening of the cavity.

The fixing material is an RTV silicone.

The optical fiber measures the temperature of the wall.

The present invention also concerns an aircraft propulsion unit having such a structure, and an aircraft having such a propulsion unit. The structure may be, for example, an air intake.

The present invention also concerns a method for installing a measuring device on a wall of a structure, the device comprising a flexible envelope having a cavity provided with an opening orifice and comprising two faces forming the longitudinal edges of the envelope, the longitudinal edges of the envelope having a decreasing thickness tapering towards the periphery, characterized in that the method comprises successively the following steps:
  applying a layer of fixing material on the surface of the wall;
  placing an optical fiber on the wall;
  placing a flexible envelope on the wall over the layer such that the optical fiber is inserted in the cavity of the envelope.

The invention relating to the method provides at least one of the following optional characteristics, taken in isolation or in combination.

A fixing layer is placed opposite the cavity when the device is installed such that the fiber is placed on the layer.

The fiber is covered with a sheath and thus forms a sheathed fiber, and the envelope is then placed such that the sheathed fiber is inserted in the cavity.

BRIEF DESCRIPTION OF THE DRAWINGS

Further aims, characteristics and advantages will emerge from the following description of the invention, which is given purely as an example and without limitation, with reference to the attached drawings in which.

DETAILED DESCRIPTION OF THE PREFERRED EMBODIMENTS

Figure 1:
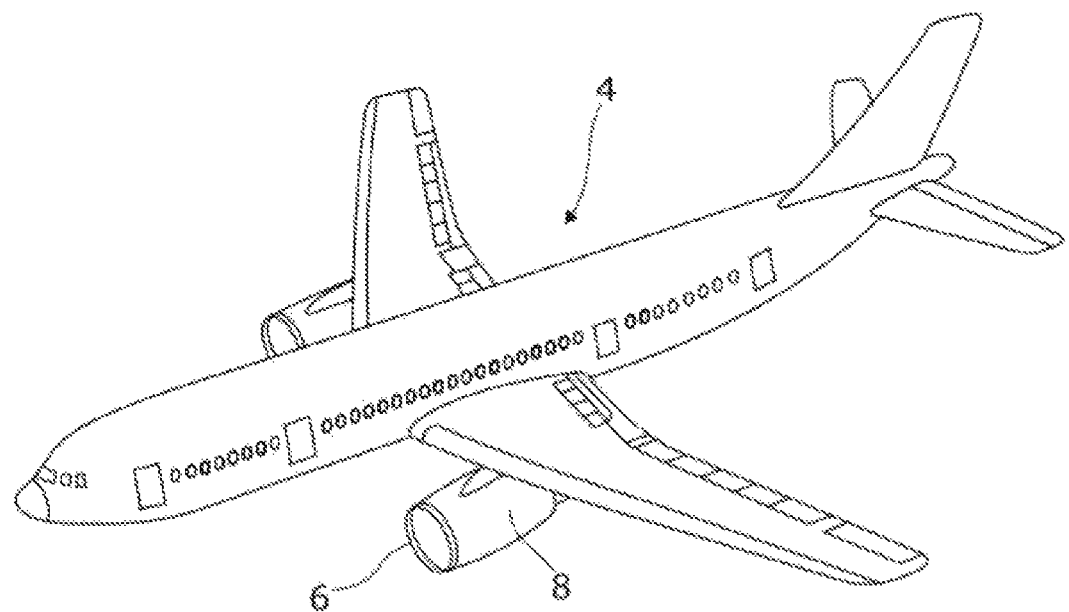
FIG. 1 shows a diagrammatic, three-dimensional view of an aircraft.
Figure 2:
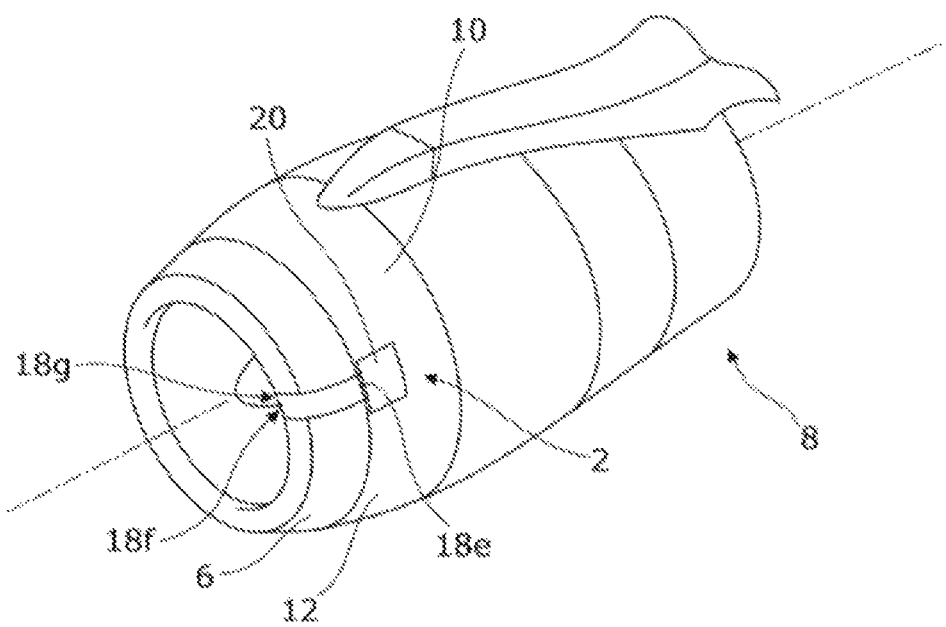
FIG. 2 shows a diagrammatic, three-dimensional view of an aircraft propulsion assembly.

According to an application illustrated in FIGS. 1 and 2, the measuring device 2 according to the present invention is fitted to a specific zone of an aircraft 4, more particularly here, the air intake 6 of a propulsion unit 8 in the context of flight tests. The present invention concerns a device 2 for measuring the temperature of a surface 10 of a wall 12.

As shown in FIG. 2, the measuring device 2 comprises an optical sensor which is closely attached to the surface 10 of the wall of the structure concerned. Thus, the sensor is held as closely as possible against the wall in order to perform the measurements. According to the embodiment illustrated, the optical sensor is an optical fiber 14, the function of which is of a known type and will be not be described in more detail. The optical fiber has the advantage of resisting the high temperatures associated with the engine air intakes 6 and also being flexible so as to follow the contours thereof. It also has the advantage of taking up little space and being lightweight. Because of its possible length, it is possible to be apply it to large structures such as the engine air intake. It offers a high speed and high precision of measurements. The optical fiber is able to measure physical variables such as, for example and without limitation, here the temperature of the surface of the wall to which it is closely attached, namely in the selected application, the temperature of the outer surface of the air intake. It offers the possibility of a multiplicity of measurements over all or part of its length. The fiber 14 is covered with a flexible sheath 16, shown in FIG. 3, made of polytetrafluoroethylene (also known as PTFE), which is resistant to high temperatures. The sheath 16 fully surrounds the fiber and takes the form of a sleeve. The fiber 14 covered with the sheath 16 will be referred to in the remainder of the description as the sheathed fiber 17.

Figure 3:
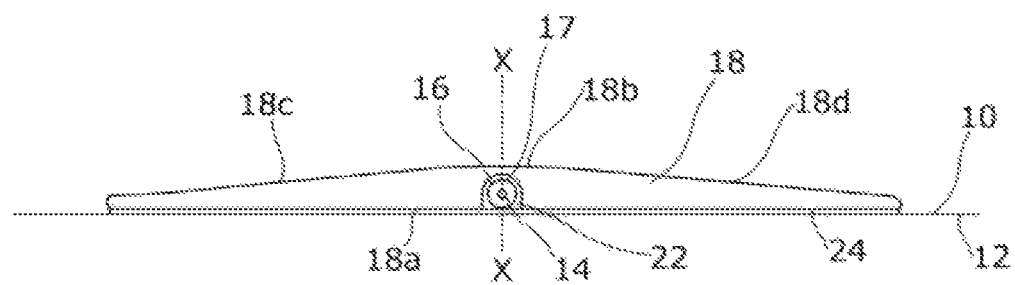
FIG. 3 shows a sectional view from the side of a measuring device closely attached to a wall of a structure according to the present invention.
Figure 4:
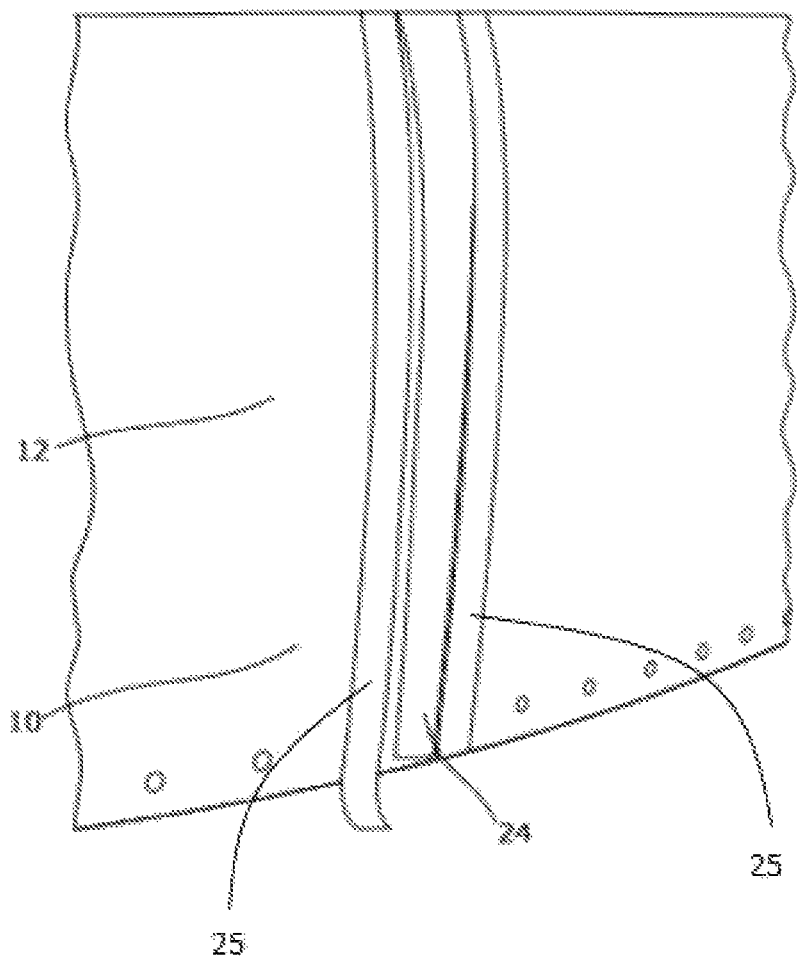
FIG. 4 shows a perspective view of the first step of an installation method according to the present invention for installing a measuring device, such as that depicted diagrammatically in FIG. 3, on an air intake of a propulsion assembly such as that shown diagrammatically in FIG. 2.
Figure 5:
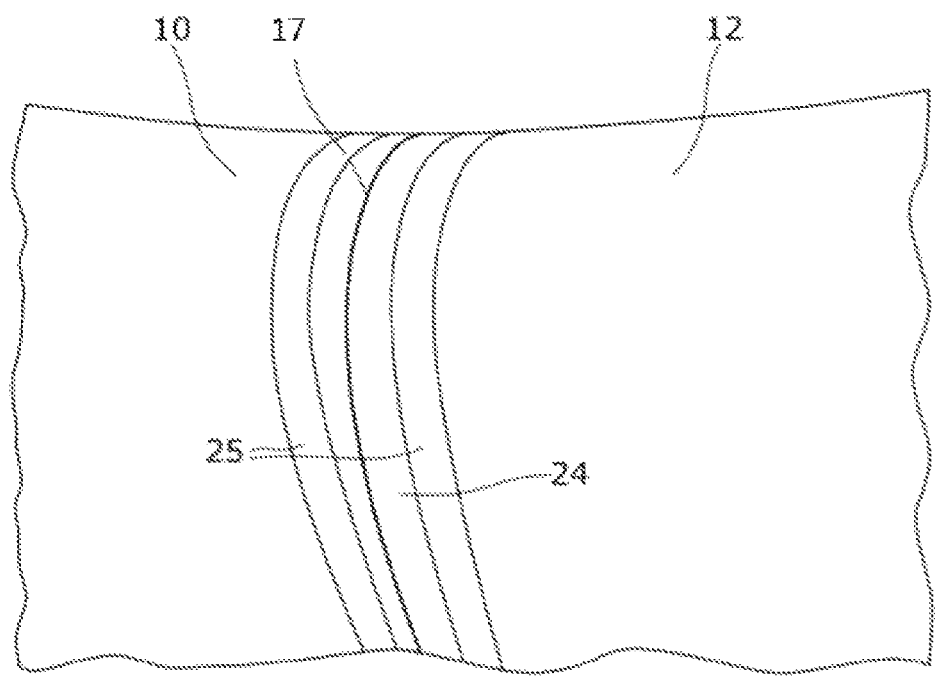
FIG. 5 shows a perspective view of the second step of the installation method.

As FIG. 3 shows, the measuring device 2 also comprises a flexible envelope 18, the main function of which is to provide streamlining for the optical sensor, which in the example illustrated is the sheathed optical fiber 17, in order to protect it against any type of external attack (impact of objects, birds or other bodies on the air intake, poor weather, or any other type of attack). As will be seen below, the sheathed fiber may be fixed or not fixed against the wall; according to one or another configuration, the envelope respectively reinforces or ensures the support of the sheathed fiber against the wall of the structure concerned.

The flexible envelope 18 may be made of polymer material, for example polyurethane or silicone, or composed of any other material which is sufficiently flexible to follow the contours of the aircraft, make it possible to protect the sheathed fiber, and be resistant to high ambient temperatures. It may be made by molding, machining or any other known production process.

In the example illustrated in FIGS. 2 to 7, the envelope 18 has an elongate, parallelepipedal form of trapezoid cross section. It is possible for the envelope to have another form and not be elongate or parallelepipedal, or even not have a trapezoid cross section as shown in FIG. 3.

In the embodiment illustrated in FIG. 3, the envelope 18 has six faces:

- a first face 18a intended to come into contact with the surface 10 of the wall 12 of the structure;
- a second free face 18b which is parallel to and opposite the first face 18a;
- two faces 18c, 18d forming the longitudinal edges of the envelope. The edges of the envelope have a decreasing thickness tapering towards the periphery, making it possible to provide a surface offering very little disruption to the aerodynamic flow;
- two faces 18e, 18f (visible in FIG. 2) forming the ends of the envelope, one of which, 18e, being intended to be connected to a unit 20 for managing the measured data, the other, 18f, corresponding to the free end 18g of the envelope. According to a possible embodiment, the faces 18e and 18f are mutually parallel; the faces 18e and 18f are also orthogonal to the faces 18a and 18b. As indicated above, the envelope 18 may have any type of shape: thus, the faces 18e and 18f do not have to be flat, but may be chamfered or even, for example, have a complex form. The free end 18g of the envelope may also have a decreasing thickness tapering towards the side opposite the unit 20, which—in the same way as the edges of the envelope—makes it possible to provide a surface which offers the minimum possible disruption to the aerodynamic flow. The face 18f is thus, in this case, sloping and not perpendicular to the faces 18a and 18b.

As illustrated in FIG. 3, the envelope 18 has a cavity 22 opening at the level of its first face 18a, intended to be in contact with the wall 12 of the structure, here the air intake. The cavity 22 is formed in the thicker central part of the envelope 18 and more precisely, in the embodiment illustrated, in the center thereof at the level of its longitudinal plane of symmetry X-X. The cavity 22 forms a housing for receiving the sheathed fiber 17. In another embodiment, the envelope may have a flexibility such that it has no cavity, but deforms when applied to the sheathed fiber such that a cavity 22 is created in the same fashion so as to form a housing.

The envelope 18 and the sheathed fiber 17 follow a same longitudinal direction, which, in the example illustrated, corresponds to that of the plane of symmetry X-X. The thickness of the cavity 22 is such that the end surface of the sheathed fiber, intended to be closely attached to the surface 10 of the wall 12, terminates flush with the surface of the first face 18a of the envelope 18, also intended to come into contact with the surface 10 of the wall 12. In this way, the sheathed fiber does not protrude beyond the envelope 18 and its extremity which is located furthest towards the outside of the envelope lies in the same plane as the first face 18a, thus most closely following the profile of the zone of the structure onto which the face 18a is intended to be closely attached.

According to an illustrated embodiment, the shape of the cavity 22 corresponds to the shape of the sheathed fiber 17 housed therein. The cavity 22 closely follows the contours of the sheathed fiber. According to a particular embodiment illustrated in FIG. 3, the cross-section of the cavity 22 has a U-shape, namely a curved surface surrounding the rounded form of the sheathed fiber and extended by two arms which form the opening orifice of the housing, through which the sheathed fiber is inserted into the housing offered by the cavity 22.

The envelope 18 and the sheathed fiber 17 are attached to the wall 12 via at least one layer 24 of fixing material, for example an adhesive material (visible in FIG. 3). The layer or layers 24 is/are provided at least partially between the surfaces of the envelope 18 and the wall 12 that are in contact, over a sufficiently large surface area to make it possible to fix the envelope onto the structure under the conditions of the surrounding environment to which it is exposed. The layer or layers 24 of fixing material is/are provided on the wall 12 of the structure over the entire surface area intended to be in contact with the envelope 18, but also on the surface opposite the opening of the cavity 22 located in the plane of the face 18a. In the embodiment illustrated, a layer 24 is applied to form a strip on the wall. To facilitate positioning, it can take two parallel longitudinal strips 25 which are spaced apart by a width at least equal to that of the layer 24 as a reference. The strips 25 are used as a reference for application of the layer 24 between them. The strips 25 may easily be removed. They may, for example, be formed by simple strips of adhesive tape. The width of the layer 24 corresponds to the width of the face 18a, but any other width is possible provided it makes it possible to adequately fix the measuring device.

As seen above, it is also possible to provide such a material only opposite the envelope 18 and not opposite the cavity 22, the sheathed fiber 17 being then held against the wall of the structure by the envelope 18. In this case, a free space (without material) for the sheathed fiber is provided during the application of the layer 24. Any fixing material is possible, provided that it is resistant to the environmental conditions to which the measuring device is exposed.

In the application of an engine air intake, for example, the measuring device 2 is exposed to very high temperatures, varying climatic conditions, pressure changes, substantial air flows and great vibrations. The measuring device may, in fact, be used both in actual flight and in simulated flight, for example in a wind tunnel. By way of example, the use of an RTV (Room Temperature Vulcanization) silicone elastomer makes it possible to provide resistance to such temperatures, while in addition making it possible to insulate the sheathed fiber against vibrations by avoiding direct contact with the wall, which improves the measurements. In the configuration in which the application of the fixing material is limited to the surface of the wall intended to be in contact with the surface of the face 18a of the envelope 18 (and not with the sheathed fiber), the sheathed fiber is in direct contact with the wall 12 for more precise measurement of its temperature.

The present invention also concerns the method for installing the measuring device 2 on the surface 10 of the wall 12 of the structure.

The method for installing the measuring device 2 on the surface 10 of the wall 12 of the structure, here the air intake, follows the steps in a very specific order. In a first step illustrated in FIG. 4, two strips 25 of adhesive tape are placed on the wall 12 in order to delimit the zone in which the sensor must be positioned. A layer 24 of fixing material, here an RTV silicone elastomer, is applied on the surface 10 between the strips 25. According to a second step illustrated in FIG. 5, the sheathed optical fiber 17 is placed on one of the layers 24 of fixing material. The sheathed fiber 17 may be thus applied directly on the layer, making precise positioning and support possible, wherein the streamlining offered by the flexible envelope is only applied in a subsequent step. With the known measuring devices, it is the envelope which is applied first. In the present invention, it is the sensor, namely the sheathed optical fiber 17, which is placed on the respective surface first.

Figure 6:
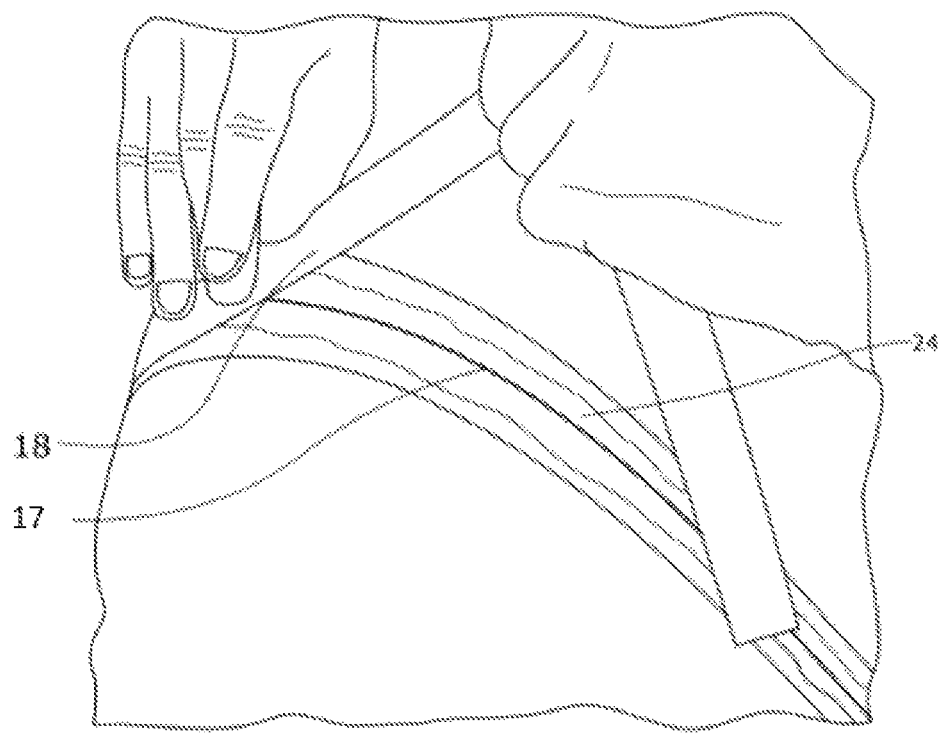
FIG. 6 shows a perspective view of the third step of the installation method.

According to a third step illustrated in FIG. 6, the flexible envelope 18 is placed on the layer 24 of fixing material such that the sheathed optical fiber 17 is inserted in the cavity 22 of the envelope 18.

Figure 7:
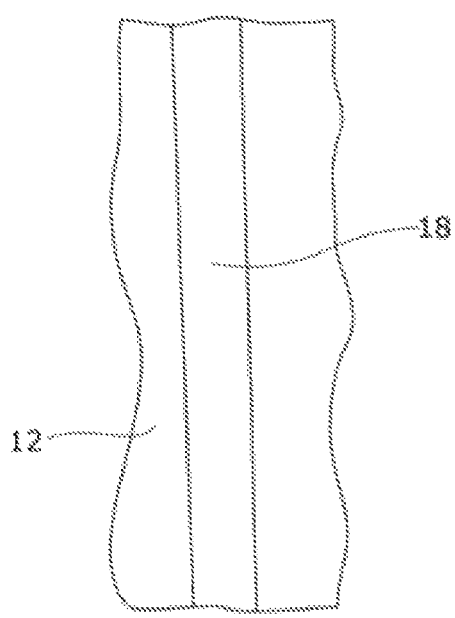
FIG. 7 shows a perspective view of a measuring device after completion of the installation method.

FIG. 7 shows the measuring device when fully installed on the structure.

The envelope 18 of polymer material and the sheathed optical fiber 17 have a very small thickness, which limits the disruption to the surrounding air flow. Disruptions to the air flow circulating around the measuring device have an influence on the measurements performed. Thus, the device according to the present invention improves the measurements performed. The installation method is simple and rapid; it is also non-intrusive, since there is no need to deform or pierce the wall of the structure. The present invention makes it possible to position a sensor as closely as possible to the wall for which measurements are desired, in order to further improve their precision.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure having a wall equipped with a measuring device comprising:
   a flexible envelope having a cavity provided with an opening orifice and comprising two faces forming longitudinal edges of the envelope and two faces forming the ends of the envelope, and
   at least one optical fiber provided in said cavity, the opening orifice of the cavity being closed by the wall on which the envelope is applied,
   wherein the longitudinal edges of the envelope have a decreasing thickness tapering towards a periphery of the envelope,
   wherein one of the ends of the envelope is connected to a unit for managing measured data, and
   wherein the other end of the envelope is free and has a decreasing thickness tapering towards a side opposite the unit for managing measured data.

2. The structure according to claim 1, wherein the cavity is produced by deformation of the envelope when said cavity is applied on the at least one optical fiber.

3. The structure according to claim 1, wherein the cavity is preformed in the envelope.

4. The structure according to claim 1, wherein the at least one optical fiber is covered with a sheath formed as a sleeve, and the at least one optical fiber is therefore a sheathed fiber.

5. The structure according to claim 1, wherein the at least one optical fiber measures a temperature of said wall.

6. The structure according to claim 1, wherein at least one layer of fixing material, resistant to conditions to which the wall is exposed, is provided at least partly between surfaces of the envelope and the wall that are in contact.

7. The structure according to claim 6, wherein the layer of fixing material is provided on the wall of the structure over an entire surface area intended to be in contact with the envelope, and also a surface opposite the opening of the cavity.

8. The structure according to claim 6, wherein the fixing material is an RTV silicone.

9. An aircraft having a structure according to claim 1.

10. An aircraft propulsion unit having a structure according to claim 1.

11. The aircraft propulsion unit according to claim 10, wherein the structure is an air intake.

* * * * *